Patented Sept. 8, 1925.

1,552,792

UNITED STATES PATENT OFFICE.

STEWART J. CARROLL, OF ROCHESTER, NEW YORK, ASSIGNOR TO EASTMAN KODAK COMPANY, OF ROCHESTER, NEW YORK, A CORPORATION OF NEW YORK.

CELLULOSE-ETHER COMPOSITION.

No Drawing.   Application filed February 24, 1923. Serial No. 621,089.

*To all whom it may concern:*

Be it known that I, STEWART J. CARROLL, a citizen of the United States of America, residing at Rochester, in the county of Monroe and State of New York, have invented certain new and useful Improvements in Cellulose-Ether Compositions, of which the following is a full, clear, and exact specification.

This invention relates to solvents for making strong solutions of cellulose ether and also relates to the cellulose ether compositions produced by the aid of such solvents. One object of my invention is to provide a solvent which will dissolve such large proportions of cellulose ethers that thick or viscous flowable solutions may be obtained for use in plastic and film making arts. Another object of my invention is to provide a cellulose ether solution which may be manufactured into strong, flexible, transparent films on the machines and by the methods now in use. Other objects will hereinafter appear.

In U. S. Patent No. 1,188,376, Lilienfeld, June 20, 1916, there are disclosed a series of alkyl ethers of cellulose. Certain of these are practically insoluble in water, and my invention relates, but is not limited, to the ethers having that property. While cellulose ethers form thin solutions in the lower monohydroxy aliphatic alcohols or in resorcinol diacetate, it has been found that such single solvents by themselves do not dissolve a sufficient proportion of the ethers to make a desirably thick flowable composition or dope, such as may be used in the manufacture of photographic film base by customary methods or in the other plastic arts.

I have discovered that an adequately strong and useful solvent may be prepared by mixing resorcinol diacetate with one or more of the lower monohydroxy aliphatic alcohols. In other words, I have discovered that mixtures of these ingredients have a greater solvent action on cellulose ethers than similar weights of such ingredients when employed by themselves. By lower monohydroxy aliphatic alcohols, I means those having less than six carbon atoms.

While the ingredients may be mixed in widely varying proportions it is noted, by way of example, that a particularly useful composition can be prepared by mixing equal parts by weight of resorcinol diacetate with the aliphatic alcohol, say methyl alcohol. In the preferred form of my invention, I dissolve 1 part by weight of the cellulose ether, say water-insoluble ethyl cellulose, in from 5 to 7 parts by weight of the solvent mixture. The ingredients by themselves are not sufficiently powerful to make properly flowable solutions of this strength. Of course, the proportion of mixed solvent or the proportion of the volatile ingredients may be increased to adapt the composition to the lacquering art, as will be understood by skilled persons.

Other substances which impart additional suppleness, or incombustibility, or other qualities, to the film may also be added to the dope, such, for instance, as triphenyl or tricresyl phosphate, monochlornaphthalene, camphor, etc. The ingredients are of the ordinary commercial type and sufficiently purified for the process of film manufacture, so as to give a dope yielding films having the proper relative freedom from color. The viscous-flowable dope above described can be used in connection with the usual film-forming apparatus without the necessity of expensive alterations in the latter.

In the formation of a film by the evaporation of the volatile ingredients from the hereinabove described compositions, a considerable amount of resorcinol diacetate remains behind, because of its relatively low volatility. It imparts useful plastifying and other properties to the film, which is normally flexible and transparent. Moreover, films containing it show remarkable flexibility after undergoing a continuous heating test at 65° C. for twelve weeks.

Having thus described my invention, what I claim as new and desire to secure by Letters Patent is:

1. A composition of matter comprising cellulose ether and resorcinol diacetate, the ingredients being homogeneously mixed in unprecipitated form.

2. A composition of matter comprising cellulose ether dissolved in a mixture of resorcinol diacetate and a lower monohydroxy aliphatic alcohol.

3. A composition of matter comprising cellulose ether dissolved in a mixture of resorcinol diacetate and methyl alcohol.

4. A flowable composition comprising 1 part of cellulose ether dissolved in from 5 to 7 parts by weight of a mixture of resorcinol diacetate and a lower monohydroxy aliphatic alcohol.

5. A composition of matter comprising cellulose ether dissolved in a mixture of substantially equal parts by weight of resorcinol diacetate and a lower monohydroxy aliphatic alcohol.

6. A composition of matter comprising 2 parts by weight of water-insoluble ethyl cellulose, 7 parts of resorcinol diacetate and 7 parts of methyl alcohol.

7. As an article of manufacture, a film comprising cellulose ether and resorcinol diacetate.

8. As an article of manufacture, a tough flexible transparent film comprising water-insoluble ethyl cellulose and resorcinol diacetate.

Signed at Rochester, New York this 19th day of February 1923.

STEWART J. CARROLL.